Feb. 7, 1967 F. A. HALS 3,303,364
MEANS FOR AND METHOD OF RECOVERING ALKALIS
FROM PRODUCTS OF COMBUSTION

Filed Oct. 14, 1963 3 Sheets-Sheet 1

FINN A. HALS
INVENTOR.

BY Aden D. Redfield
Melvin E. Frederick
ATTORNEYS

Feb. 7, 1967

F. A. HALS 3,303,364

MEANS FOR AND METHOD OF RECOVERING ALKALIS
FROM PRODUCTS OF COMBUSTION

Filed Oct. 14, 1963

FINN A. HALS
INVENTOR.

BY Adlen D. Redfield
Melvin E. Frederick

ATTORNEYS

United States Patent Office 3,303,364
Patented Feb. 7, 1967

3,303,364
MEANS FOR AND METHOD OF RECOVERING ALKALIS FROM PRODUCTS OF COMBUSTION
Finn A. Hals, Cambridge, Mass., assignor to Avco Corporation, Cincinnati, Ohio, a corporation of Delaware
Filed Oct. 14, 1963, Ser. No. 315,846
8 Claims. (Cl. 310—11)

The present invention relates generally to means for and a method of recovering alkalis from products of combustion and more particularly to the recovery of alkalis (seed) added to ionize products of combustion produced from burning coal in air or an oxygen-enriched combustible medium so that the seed can be recycled and reused within a magnetohydrodynamic (hereinafter abbreviated "MHD") electrical generating system. Although not limited to such applications, for convenience, the present invention will be described with particular reference to its use in MHD electrical generating systems.

In general terms, MHD generators produce electrical power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source.

Several different gases may be used; the gas may be products of combustion, or may comprise inert gases, such as helium or argon. In open systems, i.e., those in which the gases are not recovered after passing through the power plant, products of combustion are normally used. In closed systems, in which the gases are recovered and recirculated, it is feasible to use relatively expensive gases, such as helium and argon. To promote electrical conductivity, the gases are heated to a high temperature; conductivity may also be increased by the addition to the gases of a substance that ionizes readily at its operating temperature. Regardless of the gas used, it comprises a mixture of electrons, positive ions and neutral atoms which, for convenience, may be termed "plasma."

The temperature of the plasma is highly significant, not only to the over-all efficiency of the system, but also to the design of the MHD generator. With a higher temperature available at the inlet of the generator, a larger isentropic drop can be developed as the plasma expands through the generator, resulting in improved efficiency. Further, since the electrical conductivity of the plasma increases greatly as temperature increases, it is possible to generate a given amount of power in a relatively smaller generator, employing a smaller magnetic field, than would otherwise be possible. The increased efficiency of the system, considerably above that of conventional steam turbine power plants and the absence of hot moving parts in the generator suggests that, in time, the invention disclosed in patent application Serial No. 8,566, filed February 15, 1960, now Patent No. 3,264,501, and entitled, "Magnetohydrodynamic Power Plant," to which reference is made, will replace power generating systems of conventional design.

Combustion products from burning coal do not ionize until extremely high temperatures are reached. However, as previously noted, if a small amount of a material which ionizes more easily, such as an alkali, is added to the gas sufficient ionization can be achieved at temperatures which feasibly can be produced in combustion chambers by burning coal with a preheated oxidizer. For a plasma consisting of combustion products from coal, combustion temperatures of about 5000° F. are required for good performance. The impurity added is called seed; and the process, seeding. In practice, seeding is done by adding an alkali salt to the gas rather than the more expensive pure metal.

To date, potassium has been selected as seed for economic reasons. The least expensive potassium salt, KCl, is not suitable as seed because the chlorine atom is strongly electronegative and captures the electrons given off by the potassium. It is therefore necessary to use a more expensive salt, such as for example potassium carbonate or potassium hydroxide, as seed.

For a more thorough discussion of conductivity and the provision of a suitable plasma for MHD generators, reference is made to the aforementioned patent application Serial No. 8,566; however, for present purposes, suffice it to say that conductivity is a very strong function of the gas temperature and gas conductivity of more than one mho. per meter is required, corresponding to a minimum gas temperature of about 4000° F.

The amount of potassium carbonate, potassium hydroxide, and the like required to obtain sufficient conductivity of the plasma in an MHD generator will be of the order of 2–5% of the fuel weight. This corresponds to a seed concentration of about 0.1–0.3% by volume after combustion. The aforementioned amount of seed required is about ten times or more the amount of the potassium commonly present in coal ash. Accordingly, seed must be added to the combustion products of coal.

As may now be apparent, the use of seed is required in the operation of MHD generating systems and the cost of the seed represents a not insignificant portion of the operating costs of MHD electrical generating plants. Because the efficiency of an MHD generating plant is inherently higher than that of conventional steam generating plants (for example about 53.5% for MHD and 40% for steam generating plants of about 500 megawatt capacity), the cost of net power generated on the basis of total operating costs and total capital costs may be expected to be less than that for steam generating plants. However, without seed recovery in an MHD plant, the cost of coal plus seed exceeds the cost of coal for a comparable steam generating plant. On the basis of cost per kilowatt hour, the cost of coal and seed decreases linearly from an amount substantially in excess of the cost of coal for steam generating plants for zero percent recovery of seed to an amount substantially less than that for steam generating plants for high percentages of recovery.

In accordance with the present invention, novel apparatus for and a method of recovering alkali from products of combustion at initially a temperature of 5000° F., the alkali having been introduced into the gas to increase its electrical conductivity, comprises passing the gas through a separator to remove condensed noncombustible matter in the gas; regulating the temperature of the gas to maintain its temperature at the gas outlet of the separator at a value at which substantially all of the noncombustible matter other than the alkali in the gas condenses and greater than that at which the alkali is substantially soluble in the noncombustible matter; cooling the gas downstream of the separator to a temperature sufficient to condense the alkali in the gas; and removing the condensed alkali from the gas.

In view of the foregoing discussion, it will be apparent that it is an object of the present invention to provide apparatus for and a method of recovering seed added to ionize combustion products.

It is another object of the present invention to provide a method of recovering alkali added to ionize combustion products and reintroducing the alkali into the combustion products at its original point of introduction.

It is a further object of the present invention to provide a method of recovering seed added to ionize products of combustion to reduce the cost of producing such ionized products of combustion.

It is a still further object of the present invention to provide a method of recovering seed utilized in the operation of MHD devices.

The novel features that are considered characteristic of the present invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
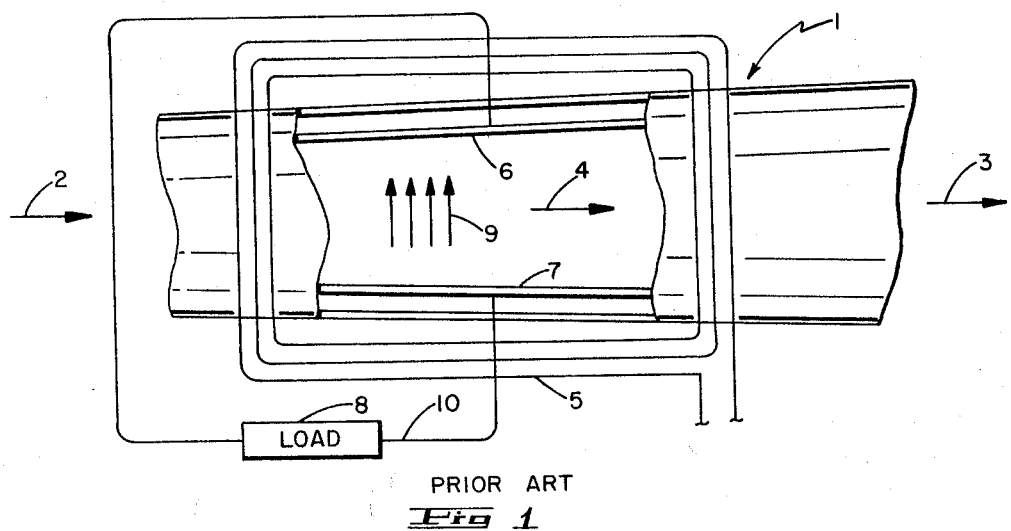
FIGURE 1 is a schematic configuration of a conventional MHD generator.

A knowledge of MHD generator principles will promote an understanding of the present invention. For this reason, there is shown in FIGURE 1 a schematic of a conventional MHD generator. As illustrated in that figure, the generator comprises a tapered duct, generally designated 1, to which high temperature, high pressure, electrically conductive plasma is introduced, as indicated by the arrow at 2, and from which it exhausts, as indicated by the arrow at 3. The pressure at the exit of the duct is lower than at its inlet; and for this reason, the plasma moves at high velocity through the duct, as indicated by the arrow at 4. By properly choosing the pressure differential and the shape of the duct, the plasma can be made to move through the duct at substantially constant velocity, which is desirable, although not necessary to the operation of the generator. Surrounding the exterior of the duct is a continuous electrical conductor in the form of a coil 5 to which electrical current may be supplied from any conventional source or from the generator itself. Flow of electrical current through the coil establishes a magnetic flux through the duct, perpendicular to the direction of plasma flow and the plane of the paper.

Within the duct are provided opposed electrodes 6 and 7. These electrodes may extend along the interior of the duct parallel to the direction of plasma movement and may be positioned opposite one another on an axis perpendicular to both the direction of plasma movement and the magnetic flux.

High velocity movement of the electrically conductive plasma through the magnetic field induces a unidirectional E.M.F. between the electrodes such as indicated by the arrows at 9. The electrodes 6 and 7 are connected by conductor 10 to a load 8 through which electrical current flows under the influence of the E.M.F. induced between the electrodes.

Figure 2:
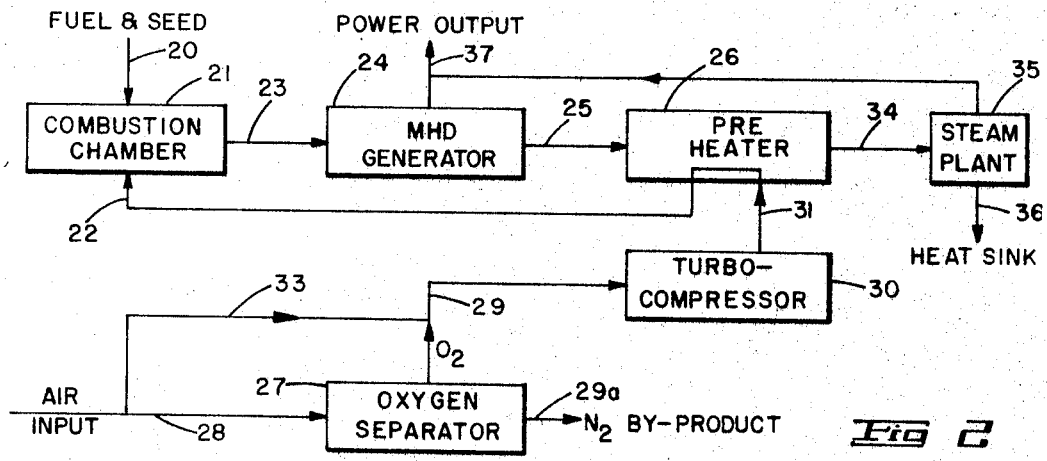
FIGURE 2 is a block diagram illustrating an MHD electrical generating system incorporating means for separating oxygen from the air for use in the combustion chamber of an open system using the oxygen cycle.

Directing attention now to FIGURE 2, there is shown a block diagram of a novel system disclosed in the aforementioned patent application Serial No. 8,566 in which fuel, such as powdered coal, is introduced with seed at 20 to combustion chamber 21. Also introduced to the combustion chamber, as at 22, is pure oxygen or an oxygen-rich combustion supporting medium. Since the heat release within the combustion chamber per pound of plasma can be greatly increased with higher concentrations of oxygen than found in air, and the normal nitrogen content of the air need not be heated to operating temperatures, the plasma leaving the combustion chamber at 23 and entering the MHD generator 24, can easily be produced at a temperature in excess of 5000° F. With a higher plasma temperature at the inlet of the MHD generator, a larger amount of energy can be extracted by the generator in expanding the plasma to a given lower pressure, resulting in increased operating efficiency.

After leaving the MHD generator, the plasma, which is now more appropriately termed a "working fluid," is introduced at 25 to a preheater 26. In the preheater, heat is extracted from the working fluid to preheat the oxygen-rich combustion supporting medium before it enters the combustion chamber.

A separator, capable of separating oxygen from air, is shown at 27. Air is introduced to the separator at 28, the oxygen leaving the separator at 29 and the nitrogen leaving the separator at 29a. The oxygen is compressed by a turbo-compressor 30 and is forced through the preheater at 31 before being introduced to the combustion chamber at 22. Air may be introduced at 33 to the oxygen if the combustion chamber is to be operated with oxygen-enriched air instead of pure oxygen. If desired, an oxygen-rich combustion supporting medium may be produced by simply reducing the nitrogen content of the air to produce an oxygen-rich mixture.

Returning to a consideration of the plasma flow, it leaves the preheater at 34 and enters a steam plant 35 of the type which includes a conventional boiler comprising a superheater reheater, evaporator, economizer, and stack cooler (not shown). Steam from the steam plant may be used to drive the turbo-compressor 30. The spent working fluid exhausts to the atmosphere at 36. Electrical power generated by the MHD generator and the steam plant leaves the system at 37.

In a system of the type described, the amount of preheat of the oxygen or oxygen-enriched air may be very slight, in the order of 1600° F. or less. For this reason, the construction of a preheater for such a system presents no problems and is well within the skill of the art.

FIGURE 2 discloses a typical oxygen cycle for a coal-fired MHD plant of 500 megawatts nominal capacity. In such a cycle, an $N_2/O_2$ ratio of 2 may be used along with a preheat temperature of the oxygen-enriched air of 1600° F. at a cycle pressure of 16 atmospheres to produce a combustion temperature of about 5100° F. at a pressure of 16 atmospheres. The hot gases expand through the MHD generator and are exhausted therefrom at a velocity of about 3000 feet per second, a stagnation temperature of about 4000° F., and a stagnation pressure of about 1 atmosphere.

Figure 3:
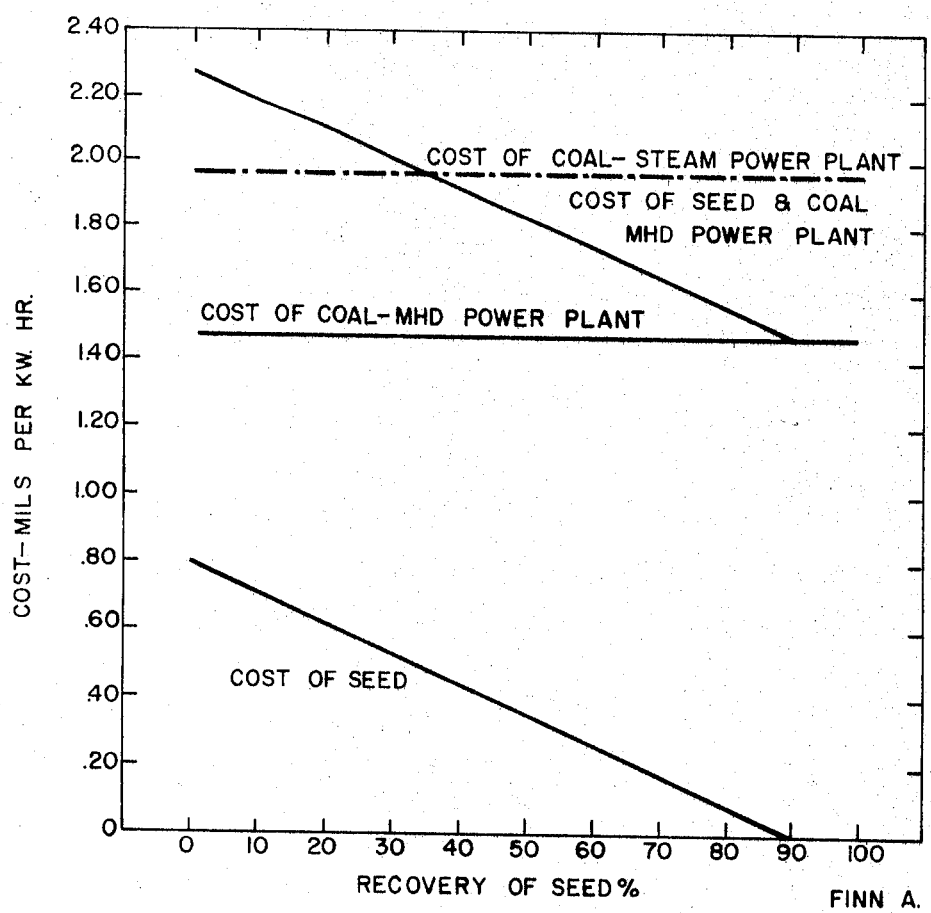
FIGURE 3 is a graph illustrating the relation of the cost of coal in steam generating plants and the cost of coal and seed for different degrees of recovery in MHD generating plants.

The cost of seed for different degrees of recovery is shown in FIGURE 3. The data used in calculating the costs of seed and coal in mils per kilowatt hour is as follows:

| | |
|---|---|
| $N_2/O_2$ | 2 mol/mol. |
| Overall cycle efficiency | 53.5%. |
| Seed | $K_2CO_3$. |
| Seeding rate | 2% of fuel weight. |
| Cost of seed | $8.50 per 100 lbs. |
| Cost of coal | $0.23 per million B.t.u. |
| Coal: | |
|     Heat value | 13,500 B.t.u./lb. |
|     Ash content | 10% of coal by weight. |
|     Potassium content | 1.5% $K_2O$ in ash by weight. |

Inspection of FIGURE 3 will show that for a coal-fired plant with 90% recovery and recycling of the recovered potassium, no additional seeded material is required as there is sufficient potassium present in the coal ash to make up for the 10% that is lost. The cost of the initial seed is considered negligible and has been neglected. The cost of coal will then represent the total cost and is 1.47 mils per kilowatt hour. By comparison, it may be noted that the fuel cost for a comparable steam power plant with 40% efficiency is 1.96 mils per kilowatt hour with the same fuel cost per million B.t.u. of $0.23. With 80% recovery, the cost of seed is 0.09 mil per kilowatt hour corresponding to 1.56 mils per kilowatt hour for coal and seed. With about 35% recovery, the cost for coal and seed is equal to the cost of coal for a steam power plant.

At this point, it is important to note that a significant feature of an MHD generator as compared to a steam generator is that combustion takes place with less excess oxygen, near stoichiometric, at much higher temperatures, about 5000° F., with subsequent very rapid cooling of the hot gases to the vicinity of 4000° F. as they expand through the MHD generator channel. The high combustion temperatures lead to a high degree of decomposition and vaporization of the mineral matter in the coal. The retention time of the gases in the MHD generator channel from inlet to outlet is of the order of 10 milliseconds.

A typical coal ash analysis with the boiling points of the respective ash constituents are as follows:

| Ash Constituent | Percentage of Ash, Percent | Boling Points (Temp. at which Vapour Pressure= 1 atm.) | |
|---|---|---|---|
| | | ° K. | ° F. |
| $SiO_2$ | 46.7 | 3,070 | 5,070 |
| | | FeO 3,400 | 5,660 |
| $Fe_2O_3$ | 23.1 | Fe 3,010 | 4,960 |
| $Al_2O_3$ | 21.6 | 3,800 | 6,380 |
| CaO | 3.3 | 3,800 | 6,380 |
| $K_2O$ | 1.39 | 1,750 | 2,690 |
| $Na_2O$ | 0.42 | 2,040 | 3,210 |
| MgO | 1.3 | 3,350 | 5,570 |
| $TiO_2$ | 1.0 | 3,200 | 5,300 |
| $SO_2$ | 2.0 | | |

Figure 4:
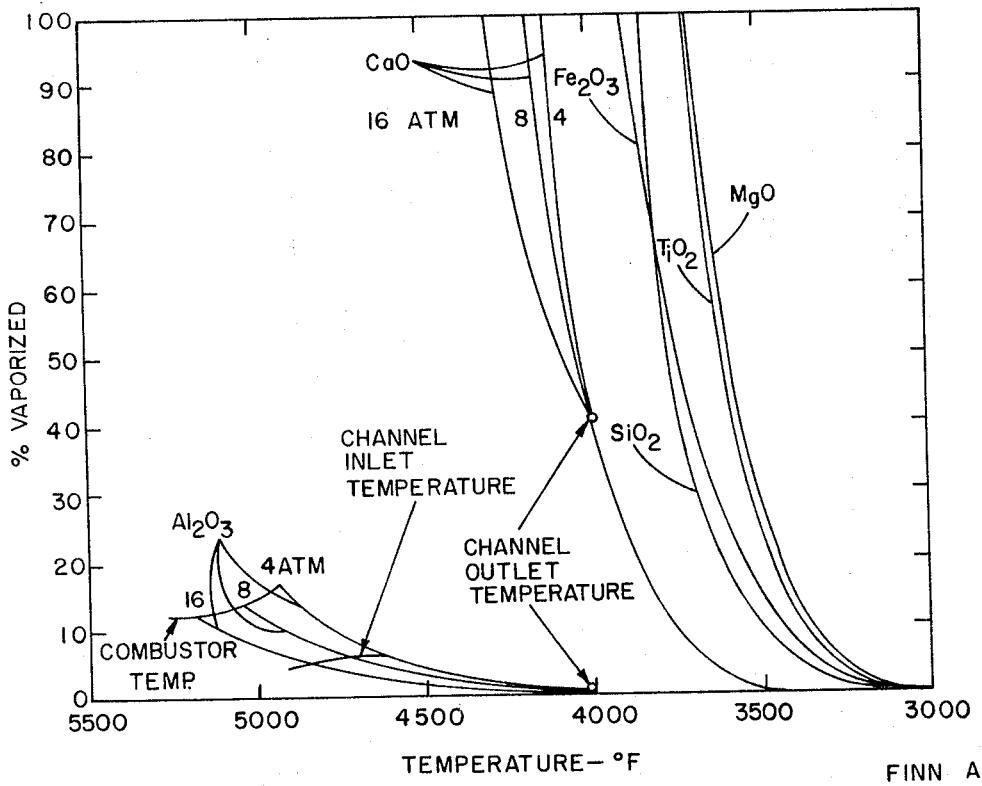
FIGURE 4 is a graph illustrating relation of the volatilization of the constituents of coal ash.

The curves of FIGURE 4 show the volatilization of each ash constituent as percent vaporized of the total amount, from combustion temperature down to 3000° F. Neutral conditions and no chemical reactions between the ash constituents have been assumed in plotting the curves. Although there are major discrepancies in the technical literature as to the boiling points and volatilization of $Al_2O_3$ and CaO, the most recent data has been used in plotting the curves of these ash constituents. For the two most stable compounds $Al_2O_3$ and CaO, three curves are shown for combustion pressures of 16, 8, and 4 atmospheres, respectively. The values corresponding to the temperature in the combustor at the channel inlet and outlet are indicated in FIGURE 4. The only compound which does not vapourize completely at the combustion temperatures is $Al_2O_3$, the amount vapourized ranging from around 12% to 17% with combustion pressures varying from 16 to 4 atmospheres. The condensation of CaO starts at the channel inlet or in the channel depending on the combustion pressure. At the outlet of the generator channel, all of the $Al_2O_3$ and practically all of the CaO have condensed.

Attention is particularly directed to the fact that, as shown in FIGURE 4, the condensation of the remaining ash constituents, except for the alkalis and the sulphur, starts at 3800° F.–3900° F. and is completed at approximately 3000° F. Attention is further directed to the fact that the alkalis being more volatile than the other inorganic matter in the coal ash, will still be in vapour form when the inorganic matter has formed liquid or solid particles, provided that the alkalis do not chemically react with the ash. In accordance with the present invention, it has been found that at or above 3000° F. the alkalis substantially do not react and form chemical compounds with the inorganic matter forming the ash. Stated differently, the alkalis is not substantially soluble in the inorganic matter forming the ash at temperatures at or above 3000° F. Since the combustors of prior art coal-fired steam generators and the like operate with maximum combustion or furnace temperatures of about 3000° F., the alkalis are soluble in the molten ash and are chemically bound to the inorganic matter in the fly ash. Accordingly, recovery of seed from such combustion products by employing existing methods and techniques in coal burning or other prior art systems is entirely impractical because the seed is chemically bound to the inorganic matter of the coal ash and no economical industrial process exists for extracting alkalis from the inorganic matter of coal ash. Further, recycling of all such impurities separated with the seed bound to the inorganic matter of ash leads to detrimental build-up of ash in MHD systems.

As will now be apparent, the essence of the present invention is the provision of apparatus for and the separation of the inorganic matter of coal ash at gas temperatures ranging from 3000° F. to 4000° F. and thereafter separating the seed from the gas. Thus, the inorganic or noncombustible matter in coal ash which has vapourized at the higher gas temperatures in an MHD electrical generating system will condense and form liquid or solid particles in the above-mentioned temperature range of 3000° F. to 4000° F., while the alkalis being much more volatile than substantially all of the other inorganic matter, will remain as vapour. The amount of inorganic matter vapourized is dependent upon, among other things, the combustion temperature, combustion process, cooling rate of combustion products, ash composition, nature of the atmosphere, and chemical reactions that occur. However, all factors taken into account, at a temperature of about 3500° F., the major part of the inorganic matter in coal ash, except for the alkalis and sulphur, is present in the liquid or solid state, and at 3000° F. the condensation of the inorganic matter excluding the alkalis and sulphur is substantially completed, the alkalis remaining in vapour form at 3000° F.

In accordance with the present invention, the inorganic matter of coal ash in the solid and liquid state can thus, in a temperature range from 3000° F. to 4000° F., be separated from the combustion products when the seed is in the gaseous state and comprises part of the gas. The separation of the inorganic matter, except for the alkalis and sulphur, can be accomplished by passing the gas through a separator to remove condensed noncombustible matter in the gas, regulating the temperature of the gas to maintain the temperature thereof at the gas outlet of the separator at a value at which substantially all of the noncombustible matter other than the alkalis and sulphur in the gas condenses and greater than that at which the alkalis is substantially soluble in the inorganic matter, cooling the gas downstream of the separator to a temperature sufficient to condense the alkalis in the gas, and removing the condensed alkalis from the gas. The aforementioned separator may comprise a conventional cyclone separator and the alkalis may be separated from the gas together with the fly ash remaining in suspension in the gas at one or several points downstream of the cyclone separator.

Figure 5:
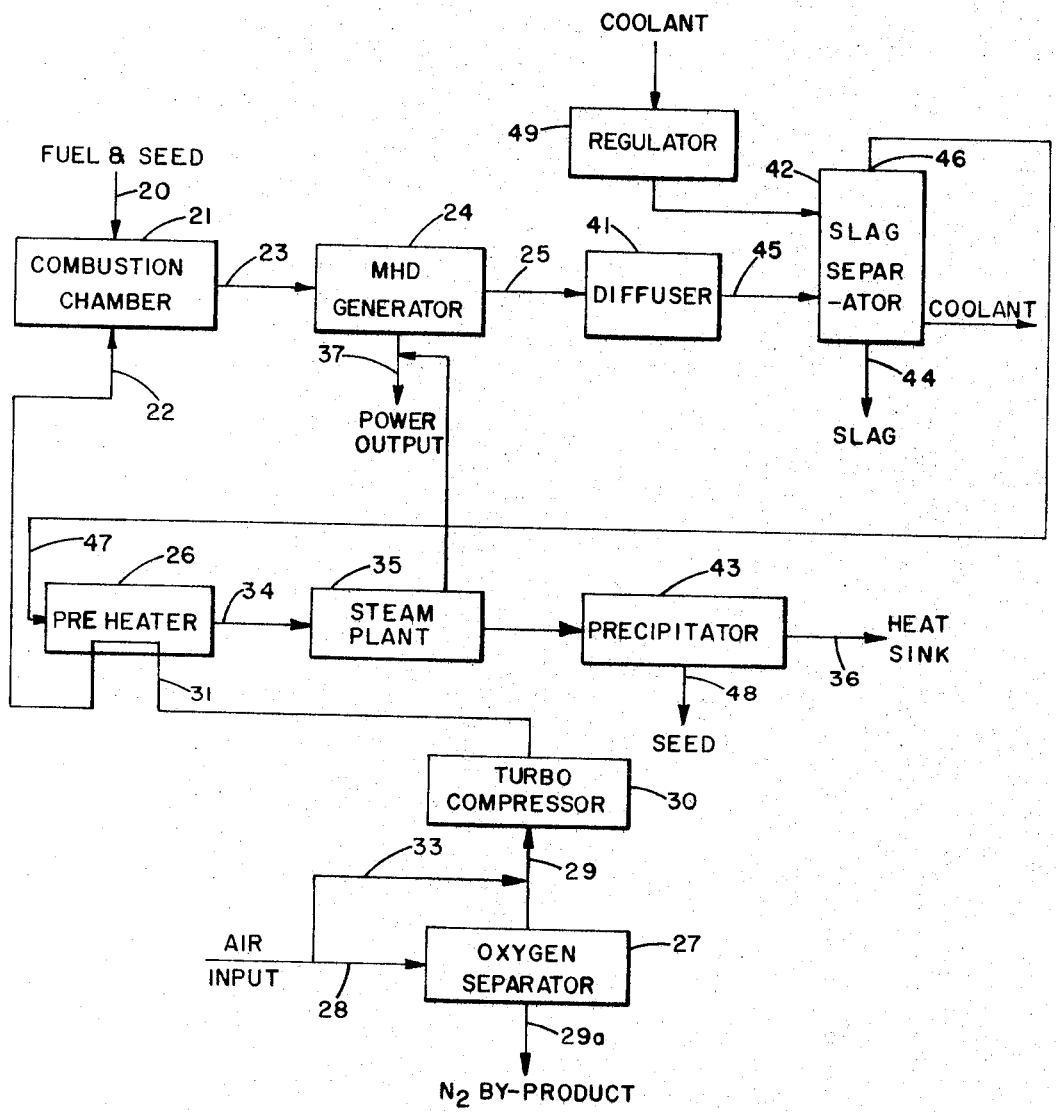
FIGURE 5 is a block diagram illustrating, in accordance with the present invention, a modification of the system disclosed in FIGURE 2.

FIGURE 5 shows, in accordance with the present invention, a modification of the system disclosed in FIGURE 4. The system of FIGURE 5 is identical to that of FIGURE 4 with the exception of the addition of the diffuser 41, slag separator 42, and precipitator 43. The working fluid from the generator 24 is introduced at 25 to the diffuser 41 which functions to minimize aerodynamic losses of the working fluid exhausted from the MHD generator. Typical temperatures and velocities of the working fluid leaving the diffuser are around 3800° F. and 500 feet per second, and the diffuser functions in conventional manner to supply this working fluid at 45 to the separator 42. The separator 42 is preferably of the conventional vertical cyclone type wherein the working fluid from the diffuser enters a cylindrical cyclone chamber tangentially at the lower part of the cyclone separator to give the gas a whirling motion in the cyclone chamber. The solid or liquid ash particles present in the gas as it enters the separator or which condenses in the separator are by centrifugal effect forced out toward the wall of the cyclone chamber. The chamber wall may be a conventional water-cooled metal wall or conventional water-cooled, refractory lined wall, or, alternately, a combination of both. The coolant for the chamber wall may be the water used to generate steam in the steam plant. A typical metal wall construction of the cyclone separator comprises vertical metal finned boiler tubes where the adjacent fins are welded together (not shown) to form a gas-tight wall. A typical refractory lined wall construction may consist of vertical studded boiler tubes lined with a high temperature protective refractory, such as for example plastic, chrome ore, or magnesium oxide (not shown) held to the boiler tubes by the metal studs. Since water-cooled surfaces are utilized, the surface temperature of the wall will be less than that of the temperature of the gas in the separator. Thus, it is merely a matter of heat transfer to maintain the desired gas temperature. As will now be apparent, conventional techniques and materials may be utilized to provide a separator of conventional design and operation. Accordingly, a further discussion of such separators is not believed to be necessary.

By regulating the pressure, temperature, and/or velocity of the coolant supplied to the separator, as by regulator 49, the temperature of the working gas in the separator, and particularly the temperature of the working gas at the outlet of the separator, may be maintained at a value at which substantially all of the noncombustible matter other than the alkali in the gas condenses and greater than that at which the alkali is substantially soluble in the noncombustible matter, i.e., at about 3000° F. to 4000° F. During operation, the walls of the separator will be coated with ash. The thickness of the ash layer on the separator walls will depend on the wall temperature, heat transfer from the hot gases in the wall, and the physical characteristics of the ash. The ash forms a liquid layer of slag on the surface of the walls which entrains ash particles in transit. The liquid slag continuously drains downward along the wall to the bottom of the separator where it can be continuously or intermittently drained in conventional manner from a tap hole located in the bottom of the separator as at 44. The main working gas flow is upwards in the separator from its point of introduction at 45 to the gas outlet 46. After leaving the separator, the working gas is introduced to the preheater 26 at 47.

The dimension of the separator is governed by the gas flow rate and physical characteristics of the ash. A separation of 80% or more of the ash impurities in the working fluid passing through the separator may be achieved by proper sizing of the separator chamber and the entrance velocity of the gas.

Since the solubility of seed in molten ash at a temperature about 3000° F. is very limited, the loss of seed dissolved in the slag will be a small percentage of the total amount of seed required in the combustion products. Further, since the slag will contain only a small percentage of seed as very stable chemical compounds, further treatment of the slag to extract the seed contained therein is considered uneconomical.

After cycloning, the working fluid passes through the preheater and the steam plant. The seed starts to condense at about 2000° F., depending on the seed concentration in the gas. Thus, the seed will condense in this part of the system as the working fluid is cooled when transferring its heat contents to generate steam and to preheat the oxidizer.

The condensed seed may now be precipitated from the working fluid together with the fly-ash remaining in suspension in the working fluid at one or several different points in the system downstream of the cyclone separator. The most effective precipitation can best be performed at the low temperature end of the system in the precipitator 43 at a temperature range of about 200° F. to 600° F. with conventional mechanical and/or electrostatic precipitators. The seed leaves the precipitator at 48. The impurities thus collected in the precipitator 43 will be highly enriched with seed and may now be directly added to the system for reuse of the seed or, alternately, the seed can be leached out of the fly-ash with water.

The various features and advantages of the embodiments disclosed are thought to be clear from the foregoing description. Various other features and advantages, not specifically enumerated, will undoubtedly occur to those versed in the art, as likewise will many advantages and modifications of the preferred embodiment of the invention illustrated, all of which may be achieved without departing from the spirit and scope of the invention.

What I claim is:

1. The method of recovering alkali from a gas at initially a temperature of about 5000° F. comprising alkali and the products of combustion of coal, said alkali having been introduced into said gas to increase its electrical conductivity, comprising the steps of:
   (a) supplying said gas to a separator at a temperature greater than 3000° F.;
   (b) passing said gas through said separator to remove condensed noncombustible matter in said gas;
   (c) regulating the temperature of said gas to maintain the temperature thereof at the gas outlet of said separator at a value less than the condensation temperature of substantially all of the noncombustible matter other than said alkali in said gas and greater than about 3000° F. whereby substantially all of said alkali in said separator does not react with the other noncombustible matter in said separator to form chemical compounds;
   (d) cooling said gas downstream of said separator to a temperature sufficient to condense said alkali in said gas; and
   (e) removing said condensed alkali from said gas.

2. The method of recovering alkali from a gas at initially a temperature of about 5000° F. comprising alkali and the products of combustion of pulverized coal, said alkali having been introduced into said gas to increase its electrical conductivity, comprising the tseps of:
   (a) supplying said gas to a separator at a temperature of about 3500° F. to 4000° F.;
   (b) passing said gas through said separator to remove condensed noncombustible matter in said gas;
   (c) regulating the temperature of said gas in said separator to maintain the temperature of said gas in excess of about 3000° F. and less than about 3500° F. at the gas outlet of said separator;
   (d) cooling said gas downstream of said separator to a temperature sufficient to condense said alkali in said gas; and
   (e) removing said condensed alkali from said gas.

3. In the method of operating a magnetohydrodynamic generator wherein a high velocity gas at initially a temperature of about 5000° F. comprising the products of combustion of coal and a predetermined quantity of an alkali is supplied to the gas inlet end of said generator, passed between opposed electrodes disposed in and normal to a magnetic field and exhausted from said generator at its gas outlet end, the steps comprising:
   (a) confining and directing the gas from the outlet end of said generator through a diffuser zone to substantially decrease the velocity of said gas;
   (b) confining and directing the gas from said diffuser zone through a separator and removing condensed noncombustible matter from the gas;
   (c) regulating the temperature of said gas to maintain the temperature thereof at the gas outlet of said separator at a value in excess of about 3000° F.;
   (d) confining and directing the gas from said separator to a temperature zone;
   (e) regulating the temperature in said second temperature zone to create a temperature sufficient to condense the alkali in the gas; and (f) removing said condensed alkali from said gas.

4. In the method of operating a magnetohydrodynamic generator wherein a high velocity gas at initially a temperature of about 5000° F. comprising the products of combustion of coal and a predetermined quantity of an alkali is supplied to the gas inlet end of said generator, passed between opposed electrodes disposed in and normal to a magnetic field and exhausted from said generator at its gas outlet end, the steps comprising:

(a) confining and directing the gas from the outlet end of said generator through a diffuser zone to substantially decrease the velocity of said gas;

(b) confining and directing the gas from said diffuser zone through a separator and removing condensed noncombustible matter from the gas;

(c) regulating the temperature of said gas to maintain the temperature thereof at the gas outlet of said separator at a value greater than about 3000° F. and less than 4000° F.;

(d) confining and directing the gas from said separator to a temperature zone;

(e) regulating the temperature in said temperature zone to create a temperature sufficient to condense the alkali in the gas; and (f) removing said condensed alkali from said gas.

5. In the method of operating a magnetohydrodynamic generator wherein a high velocity gas at initially a temperature of about 5000° F. comprising the products of combustion of coal and a predetermined quantity of an alkali is supplied to the gas inlet end of said generator, passed between opposed electrodes disposed in and normal to a magnetic field and exhausted from said generator at its gas outlet end, the steps comprising:

(a) confining and directing the gas from the outlet end of said generator through a diffuser zone to substantially decrease the velocity of said gas;

(b) confining and directing the gas from said diffuser zone through a separator and removing condensed noncombustible matter from the gas;

(c) regulating the temperature of said gas to maintain the temperature thereof at the gas outlet of said separator at a value of about 3000° F. whereby said alkali is substantially insoluble in said noncombustible matter removed in said separator;

(d) confining and directing the gas from said separator to a second temperature zone;

(e) regulating the temperature in said temperature zone to create a temperature less than 2000° F. sufficient to condense the alkali in the gas; and (f) removing downstream of said temperature zone said condensed alkali from said gas.

6. The steps as defined in claim 4 wherein said alkali is removed by precipitation at a gas temperature of about 200° F. to 600° F.

7. The steps as defined in claim 4 wherein said alkali removed from said gas is reintroduced into said gas upstream of said electrodes.

8. The method of recovering alkali from a gas at initially a temperature of about 5000° F. comprising alkali and the products of combustion of coal, said alkali having been introduced into said gas to increase its electrical conductivity, comprising the steps of:

(a) supplying said gas at a temperature in excess of about 3500° F. to a separator;

(b) regulating the temperature of said gas to maintain the temperature thereof at the gas outlet of said separator at a value less than the condensation temperature of substantially all of the noncombustible matter other than said alkali in said gas and greater than about 3000° F.;

(c) effecting in said separator condensation of substantially all of the noncombustible matter in said gas other than said alkali;

(d) removing from said gas in said separator at least a substantial portion of said condensed noncombustible matter other than said alkali;

(e) cooling said gas downstream of said separator to a temperature sufficient to condense said alkali in said gas; and (f) removing said condensed alkali from said gas.

References Cited by the Examiner

UNITED STATES PATENTS 3,214,616 10/1965 Way _____ 310—11
3,223,860 12/1965 Brill _____ 310—11

MILTON O. HIRSHFIELD, *Primary Examiner.*

DAVID X. SLINEY, *Examiner.*